United States Patent
Xu et al.

(10) Patent No.: US 12,085,475 B2
(45) Date of Patent: Sep. 10, 2024

(54) METHOD TO DETERMINE LINE ANGLE AND ROTATION OF MULTIPLE PATTERNING

(71) Applicant: Applied Materials, Inc., Santa Clara, CA (US)

(72) Inventors: Yongan Xu, Santa Clara, CA (US); Chan Juan Xing, San Jose, CA (US); Jinxin Fu, Fremont, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 182 days.

(21) Appl. No.: 17/771,557

(22) PCT Filed: Dec. 14, 2020

(86) PCT No.: PCT/US2020/064858
§ 371 (c)(1),
(2) Date: Apr. 25, 2022

(87) PCT Pub. No.: WO2021/141730
PCT Pub. Date: Jul. 15, 2021

(65) Prior Publication Data
US 2022/0364951 A1 Nov. 17, 2022

Related U.S. Application Data

(60) Provisional application No. 62/959,662, filed on Jan. 10, 2020.

(51) Int. Cl.
*G01M 11/00* (2006.01)
(52) U.S. Cl.
CPC .................................. *G01M 11/30* (2013.01)

(58) Field of Classification Search
CPC ... G01M 11/30; G01M 11/02; G02B 27/0172; G02B 27/4272; G01B 15/00
(Continued)

(56) References Cited

U.S. PATENT DOCUMENTS

| 5,616,917 A | 4/1997 | Dai |
| 5,909,333 A * | 6/1999 | Best ..................... G11B 5/5534 |
| | | 250/237 G |

(Continued)

FOREIGN PATENT DOCUMENTS

| JP | H08115959 A | 5/1996 |
| JP | 2011023248 A | 2/2011 |

(Continued)

OTHER PUBLICATIONS

International Search Report and Written Opinion dated Apr. 2, 2021 for Application No. PCT/US2020/064858.

(Continued)

*Primary Examiner* — Isiaka O Akanbi
(74) *Attorney, Agent, or Firm* — Patterson + Sheridan, LLP

(57) ABSTRACT

A method and apparatus for determining a line angle and a line angle rotation of a grating or line feature is disclosed. An aspect of the present disclosure involves, measuring coordinate points of a first line feature using a measurement tool, determining a first slope of the first line feature from the coordinate points, and determining a first line angle from the slope of the first line feature. This process can be repeated to find a second slope of a second line feature that is adjacent to the first line feature. The slope of the first and second line features can be compared to find a line angle rotation. The line angle rotation is compared to a design specification and a stitch quality is determined.

20 Claims, 5 Drawing Sheets

(58) Field of Classification Search
USPC .......................................... 356/73, 614, 138
See application file for complete search history.

(56) References Cited

U.S. PATENT DOCUMENTS

| | | | |
|---|---|---|---|
| 10,323,934 B1* | 6/2019 | Rumala | G02B 27/28 |
| 10,697,755 B1* | 6/2020 | Peters | G01B 21/042 |
| 11,656,390 B2 | 5/2023 | Park et al. | |
| 2006/0164639 A1* | 7/2006 | Horn | G01J 3/02 |
| | | | 356/326 |
| 2008/0106729 A1 | 5/2008 | Vuong et al. | |
| 2015/0198438 A1 | 7/2015 | Hetzler | |
| 2015/0205018 A1* | 7/2015 | Wei | G02B 3/00 |
| | | | 359/569 |
| 2016/0109363 A1 | 4/2016 | Weigt | |
| 2016/0292918 A1* | 10/2016 | Cummings | H04N 23/698 |
| 2017/0281102 A1* | 10/2017 | Ken | A61B 6/4035 |
| 2018/0087931 A1* | 3/2018 | Laman | G01D 5/38 |
| 2018/0348145 A1* | 12/2018 | Witte | G03F 7/706 |
| 2020/0271836 A1 | 8/2020 | Park et al. | |

FOREIGN PATENT DOCUMENTS

| | | |
|---|---|---|
| JP | 2019148898 A | 9/2019 |
| WO | 2001/035168 A1 | 5/2001 |
| WO | 2019/035579 A1 | 2/2019 |

OTHER PUBLICATIONS

Japanese Office Action dated Sep. 5, 2023 for Japanese Patent Application 2022542191.
Dai, et al., Accurate and traceable calibration of one-dimensional gratings, Apr. 28, 2005, 16, 2005 IOP Publishing Ltd, 7 page.
Extended European Search Report for European Application No. 20912199.5 dated Dec. 12, 23.

* cited by examiner

METHOD TO DETERMINE LINE ANGLE AND ROTATION OF MULTIPLE PATTERNING

BACKGROUND

Field

Embodiments of the disclosure generally relate to apparatus and methods for optical device fabrication. More specifically, embodiments of the disclosure relate to apparatus and methods for measuring stitch quality of a grating structure incorporated in a waveguide.

Description of the Related Art

Virtual reality is generally considered to be a computer generated simulated environment in which a user has an apparent physical presence. A virtual reality experience can be generated in three dimensions (3D) and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlayed on an ambient environment. Waveguides are used to assist in overlaying images. Generated light propagates through a waveguide until the light exits the waveguide and is overlayed on the ambient environment. Fabricating waveguides can be challenging as waveguides tend to have non-uniform properties. A common issue in producing waveguides is the ability to measure the stitch quality of grating lines. Previous attempts at measuring the stitch quality have proven expensive and time consuming. Accordingly, what is needed in the art are improved methods and systems of quantifying the stitch quality of grating lines on a grating structure.

SUMMARY

In one embodiment, a measurement method for a line angle is provided. The method includes selecting a field of view of a grating structure, using a measurement tool to identify a line feature, and selecting a starting point along the line feature. A primary coordinate is measured and the primary coordinate includes a first x-coordinate and a first y-coordinate, wherein the first x-coordinate is a first distance from an edge of the field of view to the primary coordinate. A secondary coordinate is measured along the line feature and the secondary coordinate includes a second x-coordinate and a second y-coordinate, wherein the second x-coordinate is a second distance from the edge of the field of view to the secondary coordinate. A theoretical line feature is estimated using the primary coordinate and the secondary coordinate and a line angle measurement is calculated between the theoretical line feature and a reference axis.

In another embodiment, a method of measuring a line angle rotation of a grating structure is provided. The method includes measuring a first line angle. Measuring the first line angle includes selecting a field of view of a grating structure, using a measurement tool to identify a line feature, and selecting a starting point along the line feature. A primary coordinate is measured and the primary coordinate includes a first x-coordinate and a first y-coordinate, wherein the first x-coordinate is a first distance from an edge of the field of view to the primary coordinate. A secondary coordinate is measured along the line feature and the secondary coordinate includes a second x-coordinate and a second y-coordinate, wherein the second x-coordinate is a second distance from the edge of the field of view to the secondary coordinate. A theoretical line feature is estimated using the primary coordinate and the secondary coordinate and a line angle measurement is calculated between the theoretical line feature and a reference axis. A second line angle is measured using the same method used to measure the first line angle. A difference of the first line angle and the second line angle is calculated to determine the line angle rotation and the line angle rotation is compared with a design specification line angle measurement.

In yet another embodiment, a method of measuring a line angle rotation of a grating structure is provided. The method includes positioning a measurement tool to measure a first image exposure in a grating structure. The method further includes measuring a first line angle. Measuring the first line angle includes selecting a field of view of a grating structure, using a measurement tool to identify a line feature, and selecting a starting point along the line feature. A primary coordinate is measured and the primary coordinate includes a first x-coordinate and a first y-coordinate, wherein the first x-coordinate is a first distance from an edge of the field of view to the primary coordinate. A secondary coordinate is measured along the line feature and the secondary coordinate includes a second x-coordinate and a second y-coordinate, wherein the second x-coordinate is a second distance from the edge of the field of view to the secondary coordinate. A theoretical line feature is estimated using the primary coordinate and the secondary coordinate and a line angle measurement is calculated between the theoretical line feature and a reference axis. The measurement tool is positioned to measure a second image exposure in a grating structure. A second line angle is measured using the same method used to measure the first line angle. A difference of the first line angle and the second line angle is calculated to determine the line angle rotation and the line angle rotating is compared with a design specification line angle measurement. A stitch quality is determined from the difference between the first line angle and the second line angle.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Aspects of the present disclosure relate to apparatus and methods for the determination of line angle and stitch quality of grating structures. In one example, a line angle is determined by measuring discreet coordinates along a line feature. In another example, the line angle of rotation is determined by measuring the line angle of multiple adjacent line grating sections.

Figure 1:
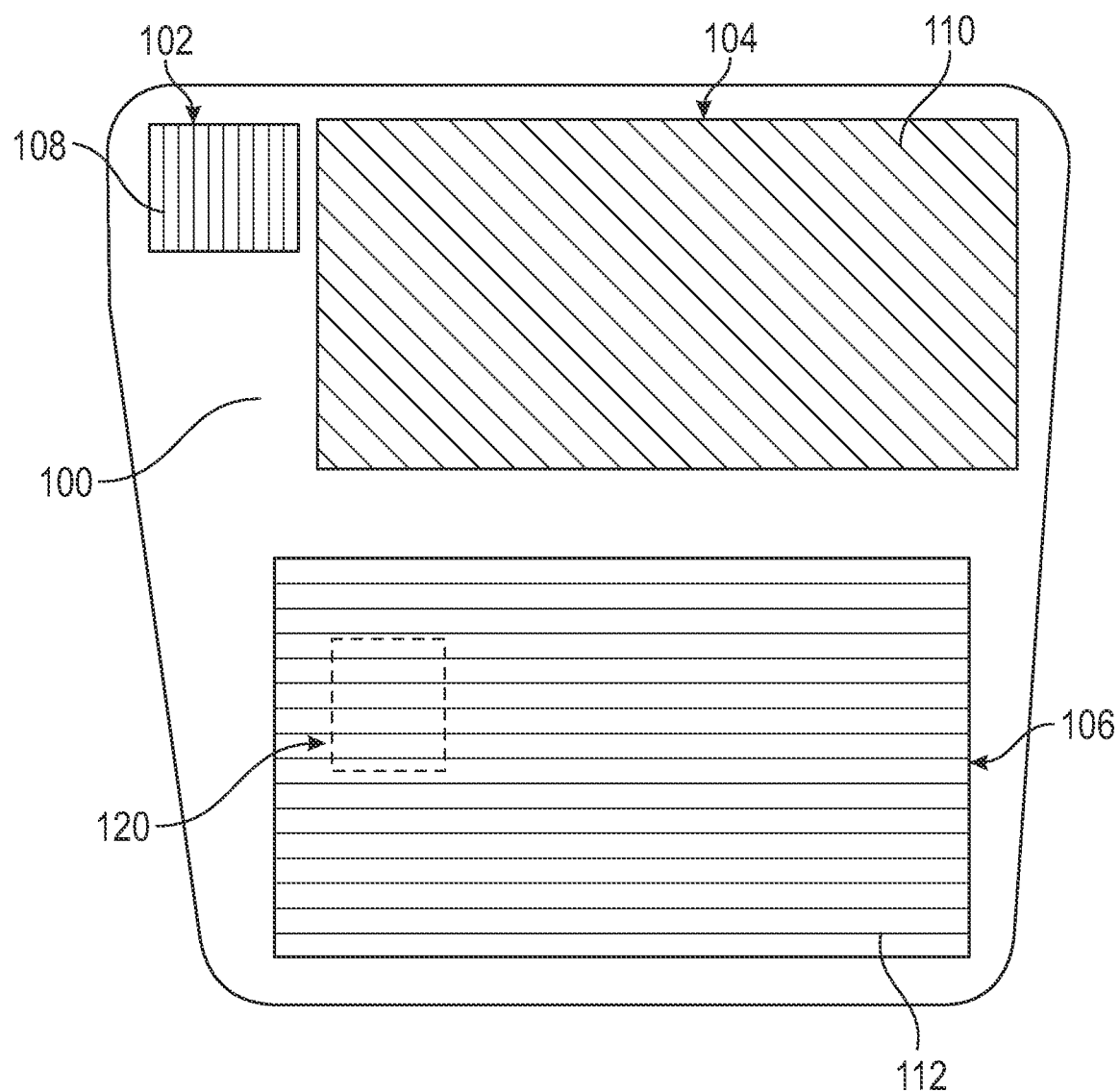
FIG. 1 illustrates a plan view of a waveguide combiner according to an embodiment of the disclosure.

FIG. 1 illustrates a plan view of a waveguide combiner 100 according to an embodiment of the disclosure. It is to be understood that the waveguide combiner 100 described below is an exemplary waveguide combiner and other waveguide combiners having different designs may benefit from the embodiments described herein. The waveguide combiner 100 includes an input coupling region 102 defined by a plurality of gratings 108, an intermediate region 104 defined by a plurality of gratings 110, and an output coupling region 106 defined by a plurality of gratings 112. A grating section 120 of the plurality of gratings 112 is within the output coupling region 106. The grating section 120 encompasses a small section of the overall output coupling region 106 and is described below in greater detail. The input coupling region 102 receives incident beams of light (a virtual image) having an intensity from a microdisplay.

Each grating, such as a fin structure or the like, of the plurality of gratings 108 splits the incident beams into a plurality of modes, each beam having a mode. Zero-order mode (T0) beams are reflected back or transmitted through the waveguide combiner 100, positive first-order mode (T1) beams are coupled though the waveguide combiner 100 to the intermediate region 104, and negative first-order mode (T-1) beams propagate in the waveguide combiner 100 a direction opposite to the T1 beams. Ideally, the incident beams are split into T1 beams that have all of the intensity of the incident beams in order to direct the virtual image to the intermediate region 104. One approach to split the incident beam into T1 beams that have all of the intensity of the incident beams is to utilize fins, which comprise the gratings 108, having a slant angle to suppress the T-1 beams and the T0 beams. The T1 beams undergo total-internal-reflection (TIR) through the waveguide combiner 100 until the T1 beams come in contact with the plurality of gratings 110 in the intermediate region 104. A portion of the input coupling region 102 may have gratings 108 with a slant angle different than the slant angle of gratings 108 from an adjacent portion of the input coupling region 102.

The T1 beams contact a fin of the plurality of gratings 110. The T1 beams are split into T0 beams reflected back or transmitted through the waveguide combiner 100, T1 beams undergo TIR in the intermediate region 104 until the T1 beams contact another fin of the plurality of gratings 110, and T-1 beams that are coupled through the waveguide combiner 100 to the output coupling region 106. The T1 beams that undergo TIR in the intermediate region 104 continue to contact gratings of the plurality of gratings 110 until either the intensity of the T1 beams coupled through the waveguide combiner 100 to the intermediate region 104 is depleted, or remaining T1 beams propagating through the intermediate region 104 reach the end of the intermediate region 104.

The plurality of gratings 110 is tuned to control the T1 beams coupled through the waveguide combiner 100 to the intermediate region 104 to control the intensity of the T-1 beams coupled to the output coupling region 106 to modulate a field of view of the virtual image produced from the microdisplay from a user's perspective and increase a viewing angle from which a user can view the virtual image. One approach to control the T1 beams coupled through the waveguide combiner 100 to the intermediate region 104 is to fabricate the slant angle of each fin of the plurality of gratings 110 to control the intensity of the T-1 beams coupled to the output coupling region 106. A portion of the intermediate region 104 may have gratings 110 with a slant angle different than the slant angle of gratings 110 from an adjacent portion of the intermediate region 104. Furthermore, the gratings 110 may have fins with slant angles different than the slant angles of fins of the gratings 108.

The T-1 beams coupled through the waveguide combiner 100 to the output coupling region 106 undergo TIR in the waveguide combiner 100 until the T-1 beams contact a grating of the plurality of gratings 112 where the T-1 beams are split into T0 beams reflected back or transmitted through the waveguide combiner 100. T1 beams that undergo TIR in the output coupling region 106 until the T1 beams contact another fin of the plurality of gratings 112 and T-1 beams coupled out of the waveguide combiner 100. The T1 beams that undergo TIR in the output coupling region 106 continue to contact fins of the plurality of gratings 112 until either the intensity of the T-1 beams coupled through the waveguide combiner 100 to the output coupling region 106 is depleted or remaining T1 beams propagating through the output coupling region 106 have reached the end of the output coupling region 106. The plurality of gratings 112 are tuned to control the T-1 beams coupled through the waveguide combiner 100 to the output coupling region 106 in order to control the intensity of the T-1 beams coupled out of the waveguide combiner 100 to further modulate the field of view of the virtual image produced from the microdisplay from the user's perspective and further increase the viewing angle from which the user can view the virtual image.

One approach to control the T-1 beams coupled through the waveguide combiner 100 to the output coupling region 106 is to fabricate the slant angle of each fin of the plurality of gratings 112 to further modulate the field of view and increase the viewing angle. A portion of the intermediate region 104 may have gratings 110 with a fin slant angle different than the slant angle of fins of the gratings 110 from an adjacent portion of the intermediate region 104. Furthermore, the gratings 112 may have fin slant angles different than the fin slant angles of the gratings 108 and the gratings 110. In some embodiments, the structures in 108, 110 and 112 are 2D patterns, such as a rotated elongated pillar, a Via hole feature, or a circular pillar.

Figure 2:
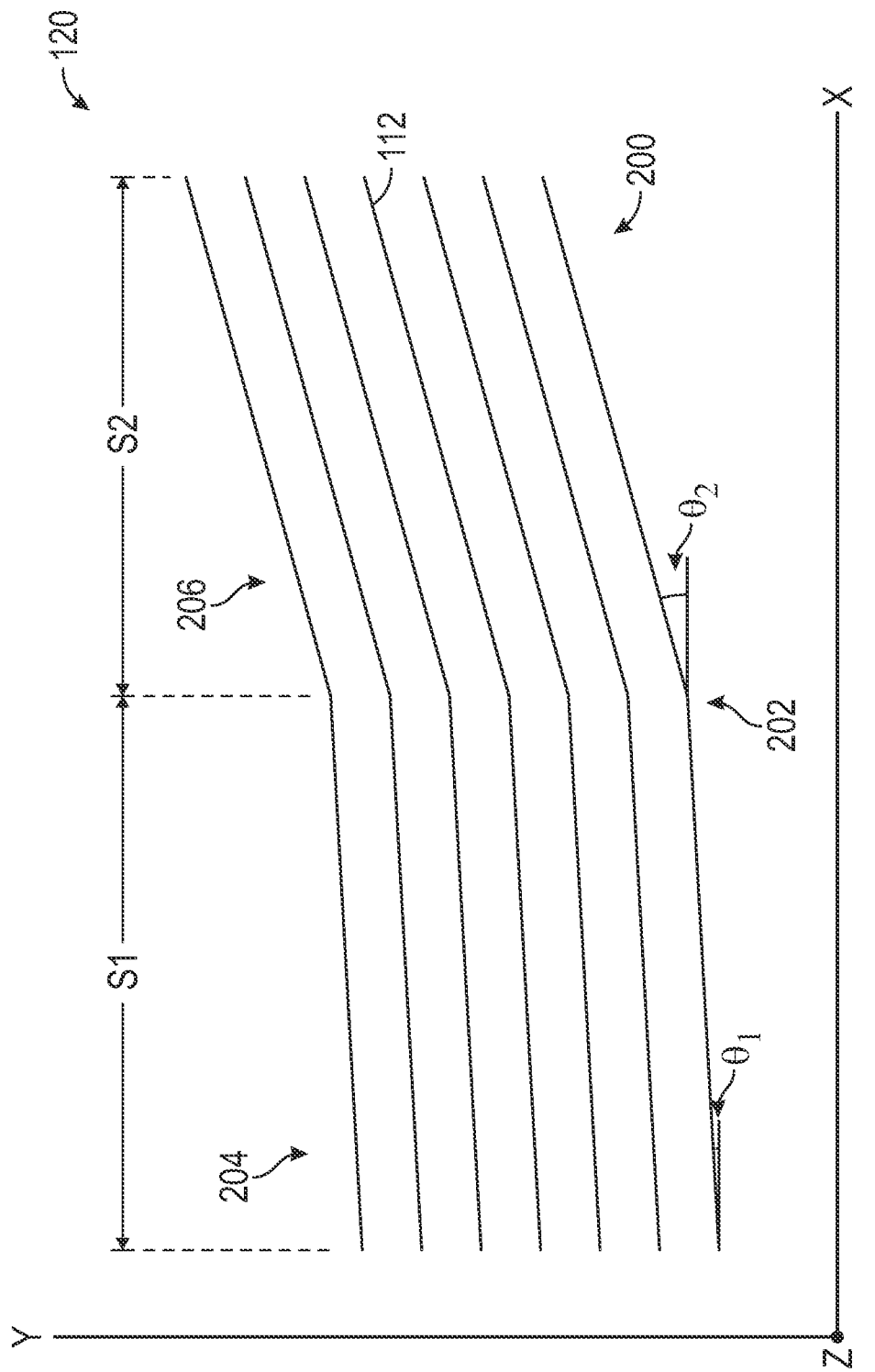
FIG. 2 illustrates a schematic plan view of a plurality of gratings formed by two adjacent image exposures according to an embodiment of the disclosure.

FIG. 2 illustrates a schematic plan view of a plurality of gratings 112 formed by two image exposures according to an embodiment of the disclosure. FIG. 2 is illustrated in FIG. 1 as the grating section 120 that encompasses a part of the output coupling region. The grating section 120 is shown in reference to an x-coordinate, a y-coordinate, and a z-coordinate. The plurality of gratings 112 includes a grating structure 200. The grating structure 200 includes a first set of line features 204 formed by a first image exposure and a second set of line features 206 formed by a second image exposure. The first set of line features 204 and the second set of line features 206 intersect at a junction 202. The junction 202 may be considered the point at which two sets of line features 204, 206 are joined together during processing. The junction 202 results from the use of multiple masks or image exposures to create the grating structure 200.

The use of multiple masks to create the grating structure 200 significantly lowers the cost of mask design and fabrication. Some attempts to create masks large enough to create the plurality of gratings 112 covering the entirety of the output coupling region 106 have been made, but using a single mask has been shown to be extremely expensive. Current methods of producing the plurality of gratings 112 utilize multiple masks or the repeated use of the same mask in order to pattern the grating structure 200. For example, the grating structure 200 is made in sections, which include a first section S1 and a second section S2. The first and second sections S1, S2 may be described as image exposures. The first section S1 includes the first set of line features 204, and the second section S2 includes the second set of line features 206. In some embodiments, additional sections are utilized and the additional sections are stitched together with junctions 202 between each section. The additional sections may be stitched together to make up the entirety of the plurality of gratings 112 within the output coupling region 106. The stitching process described above with relation to the plurality of gratings 112 and the output coupling region 106 can similarly be applied to the plurality of gratings 108 and the input coupling region 102 or the plurality of gratings 110 and the intermediate region 104.

Each of the line features 204, 206 include a line angle $\theta_1$, $\theta_2$, respectively. A first line angle $\theta_1$ is defined as the angle between the plurality of gratings 112 within the first set of line features 204 and the x-axis. A second line angle $\theta_2$ is defined as the angle between the plurality of gratings 112 within the second set of line features 204 and the x-axis. Representative line angles $\theta_1$ and $\theta_2$ are shown on the bottom grating of each of section S1 and section S2. However, the line angles $\theta_1$, $\theta_2$ are found from any one of the plurality of gratings 112 in section S1 and section S2. In some embodiments, the individual line angles $\theta_1$, $\theta_2$ are found for each of the plurality of gratings 112 within the first and second sections S1, S2. Accordingly, a line angle measurement may be obtained for each grating with respect to the x-axis. The line angle measurements within Section S1 are averaged to find a first average line angle. The line angle measurements within Section S2 are also averaged to find a second average line angle.

In alternative embodiments, the line angles $\theta_1$, $\theta_2$ are calculated with respect to the y-axis. The line angles may be found with respect to any line or axis within the same plane of the line angles, as long as the axis is used consistently for all of the line angle measurements. Consistently utilizing a line or axis as the reference line is done for the purpose of providing a common reference point and enabling comparison between the line angle measurements.

Figure 3:
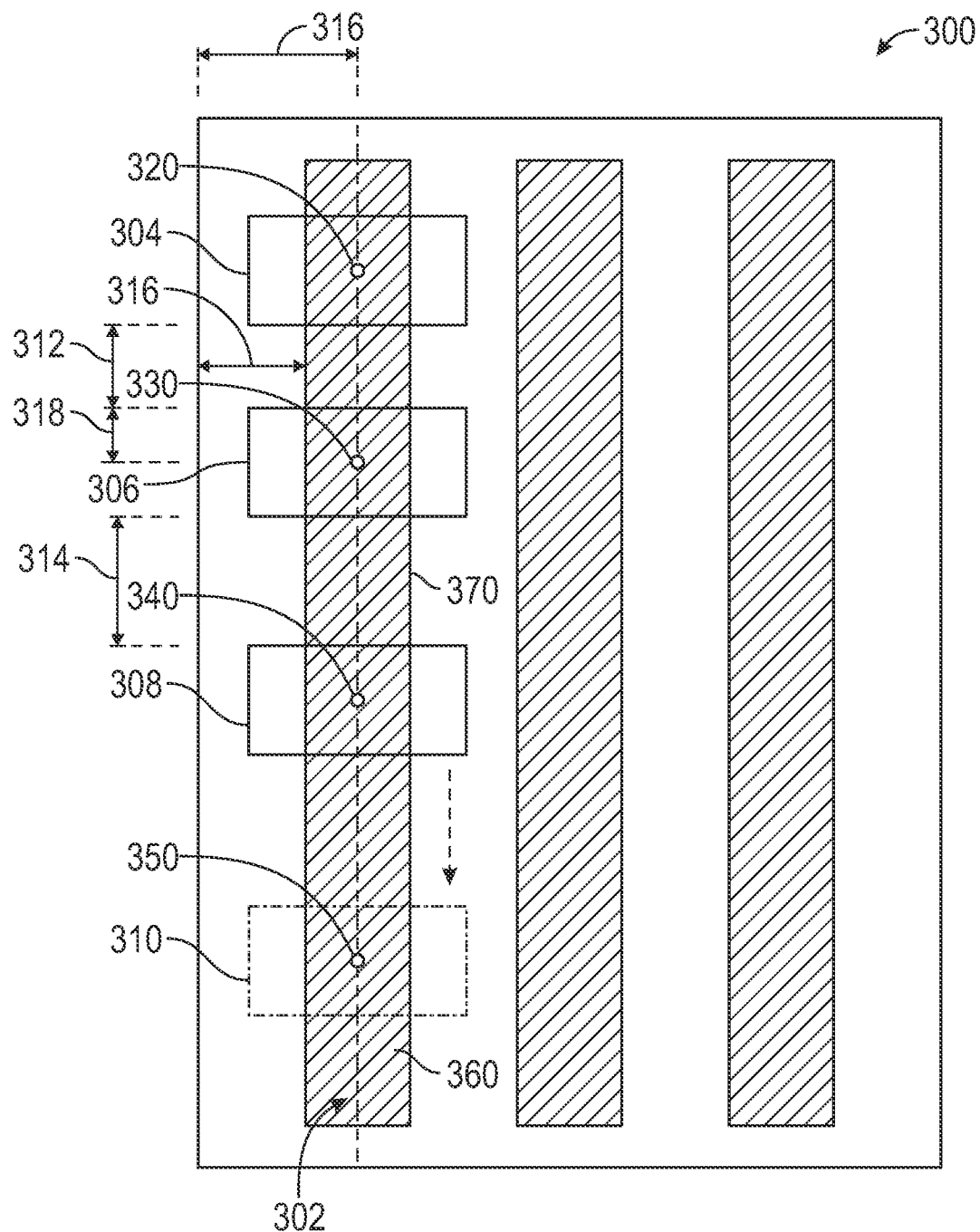
FIG. 3 illustrates a schematic plan view of a grating and measurement characteristics of the grating according to an embodiment of the disclosure.

FIG. 3 illustrates a schematic plan view of a grating and measurement characteristics of the grating according to an embodiment of the disclosure. FIG. 3 further illustrates a field of view 300 of a measurement tool. In some embodiments, the measurement tool includes a scanning electron microscope. The field of view 300 includes a grating structure. The grating structure may be similar to the grating structure 200 as shown in FIG. 2. Within the field of view 300 of the measurement tool is a line feature 302. The measurement tool is capable of identifying one or more line features 302. The line feature 302 of FIG. 3 may be similar to any one of the plurality of gratings 112 described with regard to FIGS. 1 and 2. Although only one line feature 302 is shown in FIG. 3, it is generally understood that multiple line features 302 would be within the field of view 300 of the measurement tool at a given time. The measurement tool is part of a measurement tool assembly capable of distinguishing between each line feature 302, such that the measurement tool can lock into focus on one line feature 302 when multiple line features 302 are within the field of view 300. The measurement tool assembly distinguishes between each line feature by using a line tracking program. The line tracking program can be part of a controller or computer that measures data from the measurement tool. The line feature 302 discussed in relation to FIG. 3 is part of a section of line features 302, such as line features 204 and 206 in FIG. 2. Only one line feature 302 is shown in FIG. 3. In another embodiment (not shown here), the line feature is an elongated bar shape, a circular pillar, or a via hole shape The line feature 302 may be measured using discreet coordinate point measurements along a central axis that travels through the length of the line feature 302. For example, the discreet coordinate point measurements include a primary coordinate 320, a secondary coordinate 330, a tertiary coordinate 340, and an $n^{th}$-coordinate 350. The $n^{th}$-coordinate 350 is representative of any coordinate in a sequence of coordinates past the tertiary coordinate 340. In some embodiments the $n^{th}$-coordinate 350 is a $4^{th}$ coordinate, a $5^{th}$ coordinate, a $6^{th}$ coordinate, or greater. There may be discreet coordinate points not shown in FIG. 3. The coordinates 320, 330, 340, 350 are found at the center of measurement regions. The primary coordinate 320 is positioned at the center of a first measurement region 304. The secondary coordinate 330 is positioned at the center of a second measurement region 306. The tertiary coordinate 340 is positioned at the center of a third measurement region 308. The $n^{th}$-coordinate 350 is positioned at the center of the $n^{th}$ measurement region 310. A starting point along the line feature 302 may be the primary coordinate 320 or the intersection of the line feature 302 and the edge of the field of view 300 closest to the primary coordinate 320. Alternatively, the starting point may be a point between the primary coordinate 320 and the intersection of the line feature 302 and the edge of the field of view 300 closest to the primary coordinate 320. The distance from the edge of the field of view 300 that intersects the line feature 302 to the primary coordinate 320 is less than about 500 nm, such as less than 400 nm, such as less than 300 nm. In some embodiments, the distance from the edge of the field of view 300 that intersects the line feature 302 to the primary coordinate 320 is between about 300 nm and about 400 nm, such as about 350 nm. In some embodiments the distance from the edge of the field of view 300 that intersects the line feature 302 to the starting point is less than about 400 nm, such as less than about 350 nm, such as less than about 250 nm, or such as less than 150 nm.

In some embodiments, the primary coordinate 320, secondary coordinate 330, tertiary coordinate 340, and the $n^{th}$ coordinate 350 can all be measured with respect to an x-axis and a y-axis. The x-axis and the y-axis may be any x-y reference axes chosen by a user. In this embodiment, the primary coordinate 320 includes a first x-coordinate and a first y-coordinate and the first x-coordinate is a first distance from an edge of the field of view 300 to the primary coordinate 320. In this embodiment, the y-axis and the zero point of the x-axis is an edge of the field of view 300. The edge of the field of view 300 that includes the y-axis is an edge parallel to the line feature 302. The y-axis may also be within the same plane on a z-axis. The y-coordinate of the primary coordinate is any y-coordinate along the y-axis.

The secondary coordinate 330 includes a second x-coordinate and a second y-coordinate and the second x-coordinate is a second distance from the edge of the field of view 300 to the secondary coordinate 330. The second x-coordinate and second y-coordinate are found using the same x-axis and y-axis as used to find the first x-coordinate and the first y-coordinate.

The tertiary coordinate 340 includes a third x-coordinate and a third y-coordinate and the third x-coordinate is a third distance from the edge of the field of view 300 to the tertiary coordinate 340. The third x-coordinate and third y-coordinate are found using the same x-axis and y-axis as used to find the first x-coordinate and the first y-coordinate.

The $n^{th}$ coordinate 350 includes an $n^{th}$ x-coordinate and an $n^{th}$ y-coordinate and the $n^{th}$ x-coordinate is an $n^{th}$ distance from the edge of the field of view 300 to the $n^{th}$ coordinate 350. The $n^{th}$ x-coordinate and $n^{th}$ y-coordinate are found using the same x-axis and y-axis as used to find the first x-coordinate and the first y-coordinate.

Each of the primary coordinate, secondary coordinate, tertiary coordinate, and $n^{th}$ coordinate are found with respect to one another and using the same x-axis and the same y-axis. An alternative method may utilize coordinate systems besides an x-y axis, such as a radial coordinate system.

A first spacing distance 312 is a distance between the first measurement region 304 and the second measurement region 306. A second spacing distance 314 is a distance between the second measurement region 306 and the third measurement region 308. In some embodiments, the first spacing distance 312 and the second spacing distance 314 are the same distance. Alternatively, the first spacing distance 312 and the second spacing distance 314 are different distances, such that the first spacing distance 312 is smaller than the second spacing distance 314. In another embodiment, the first spacing distance 312 is larger than the second spacing distance 314.

There may be subsequent spacing distances between each measurement region up until the $n^{th}$ measurement region 310. In this embodiment, the spacing distances 312, 314, etc. between each measurement region can be either the same distance or different distances. In some embodiments, the distances between each measurement region alternate between the first spacing distance 312 and the second spacing distance 314. In some embodiments, the spacing distances 312, 314 between each measurement region 304, 306, 308, and 310 is between about 200 nm and about 2000 nm. For example, the spacing distances 312, 314 between each measurement region 304, 306, 308, and 310 is between about 500 nm, and about 1500 nm, such as between about 750 nm and about 1250 nm. In some embodiments, each measurement region 304, 306, 308, and 310 are considered regions of interest. In the embodiment illustrated in FIG. 3, the measurement regions 304, 306, 308, and 310 are measurement boxes, wherein the measurement boxes have two sets of parallel lines forming an enclosed parallelogram.

Another measurement utilized is an inner region length 318. The inner region length 318 is the distance from the coordinates 320, 330, 340, and 350 to the edge of the measurement regions 304, 306, 308, and 310 that is perpendicular to the line feature 302. For example, the inner region length 318 is the distance from the primary coordinate 320 to the edge of the first measurement region 304 that is perpendicular to the line feature 302. This inner region length 318 can be taken from either of the two sides perpendicular to the line feature 302. The inner region length 318 will be the same whether taken from either edge of the first measurement region 304 because the primary coordinate 320 is in the center of the measurement region 304. Two times the inner region length 318 is the distance from one edge of the first measurement region 304 to the opposite edge of the measurement region 304 when the edges are perpendicular to the line feature 302. The same approach can be taken to measure the inner region length 318 within any of the other measurement regions 306, 308, 310. In some embodiments, the inner region length 318 is the same for all measurement regions 304, 306, 308, 310 and coordinates 320, 330, 340, 350.

The inner region length and the spacing distances 312 and 314 can be added together in different combinations to represent the total distance between one coordinate point and another coordinate point. In one embodiment, the total distance between the primary coordinate 320 and the secondary coordinate 330 is the first spacing distance 312 summed with two times the inner region length 318. The total distance between the secondary coordinate 330 and the tertiary coordinate 340 is the second spacing distance 314 summed with two times the inner region length 318. This relationship is the same for all subsequent distances between coordinate points.

In some embodiments, the total distance between each set of adjacent coordinate points is the same. The total distance between each set of adjacent coordinate points may be pre-set or determined automatically by a controller that is programmed to determine the measurement distance. In each example, there can be a pre-set distance for the inner region length 318. In some embodiments, the inner region length 318 is pre-set and the spacing distances 312 and 314 vary. The spacing distances 312 and 314 may vary automatically to reduce noise, or may have a pre-set variation pattern. In some embodiments, the spacing distance 312 and 314 is varied between each measurement region in order to optimize the location of the measurements with respect to the overall line feature 302. Accordingly, measurements can be taken within a certain range on the line feature 302. For example, measurements may not be desired near the edges of a line feature 302. A user may wish to take data at a set distance from the edge of each set of line features 302.

In some embodiments, the total distance between a set of adjacent coordinates is between about 200 nm and about 2000 nm. For example, between about 500 nm, and about 1500 nm, such as between about 750 nm and about 1250 nm. In some embodiments, the total distance between a set of adjacent points is approximately 1000 nm.

A variable distance 316 may also be determined. The variable distance 316 is the distance from a reference axis to the line feature 302 at any given point along the line feature 302. In some embodiments, the variable distance 316 is described as the x-coordinate of points along the line feature 302. The reference axis is any axis parallel to and within the same plane as the line feature 302. In some embodiments, the reference axis is the edge of the field of view 300 that is parallel to the line feature 302. In yet another embodiment, the reference axis may be any axis parallel to the line feature 302, as long as the same axis is used when measuring all points along a section of the line feature 302. In some embodiments, the same reference axis may be used for one section of line features 302 as another section of line features 302. In this embodiment, the reference axis for Section S1 of FIG. 2 would be the same reference axis for Section S2 of FIG. 2. In some embodiments, the reference axis can be a different reference axis for Section S1 than the reference axis used for Section S2. However, both reference axes are parallel to one another.

The variable distance 316 is found for each coordinate point along the line feature 302, such that a first variable distance is found between the reference axis and the primary coordinate, a second variable distance is found between the reference axis and the secondary coordinate, a third variable distance is found between the reference axis and the tertiary coordinate, and an $n^{th}$ variable distance is found between the reference axis and the $n^{th}$ coordinate.

As shown in FIG. 3, the line features 302 are a 2D line feature 360. The 2D line feature 360 can be a rotated elongated pillar, a circular pillar, a via hole feature, or any other suitable 2D pattern. In this embodiment, the line feature 302 shown in FIG. 3 is a central axis of the 2D line feature 360. The 2D line feature 360 is shown as a rectangle in FIG. 3, but it is generally understood that the 2D line feature 360 is any two dimensional shape. The two dimensional shape includes a rotated elongated pillar, a circular pillar, and a via hole feature. In embodiments in which the line features 302 are 2D line features 360 and the measured line features 302 are central axes of the 2D line features, the central axis is parallel to the length 370 of the 2D line feature 360. The length 370 of the 2D line feature 360 is further defined as the long edge of the 2D line feature 360.

Figure 4:
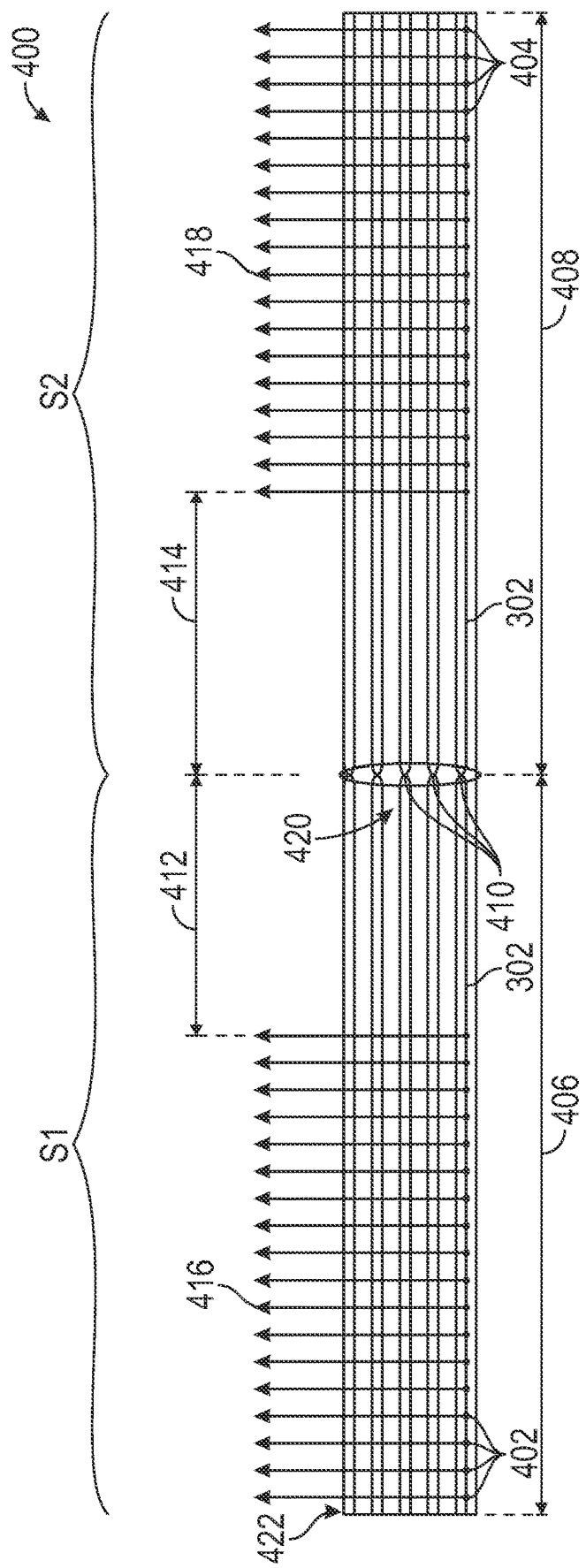
FIG. 4 illustrates a schematic view of an interface boundary between two adjacent line features according to an embodiment of the disclosure.

FIG. 4 illustrates a schematic view of an interface boundary between two adjacent line features 302 according to an embodiment of the disclosure. The interface boundary 400 includes two adjacent sets of line features 302 and an interface point 410 between two adjacent sets of line features 302. The two adjacent sets of line features 302 may be similar to the first set of line features 204 and the second set of line features 206 of FIG. 2. Similar to FIG. 2, the first and second set of line features 204 and 206 are grouped into Section 1 51 and Section 2 S2 as shown in FIG. 2.

The exemplary interface boundary 400 has a first section with a first section length 406 and a second section with a second section length 408. The first section length 406 and the second section length 408 approximate or equal the distance from one interface point on a first end 420 of a set of line features 302 to another interface point (not shown) on a second other end 422 of the same set of line features 302. The interface point 410 is the point at which two adjacent sets of line features 302 meet. Each set of line features 302 have a set of measured points 402 and 404. Section S1 includes measured points 402 and Section S2 comprises measured points 404. The measured points 402 and 404 are any one of the primary coordinate 320, the secondary coordinate 330, the tertiary coordinate 340, and the $n^{th}$ coordinate 350 as well as points in between. Each one of the measured points 402 and 404 have a reference arrow set 416 and 418 shown in FIG. 4 to show where each of the measured points 402 and 404 are on the horizontal axis. A first reference arrow set 416 is shown in Section S1, while a second reference arrow set 418 is shown in Section S2. The reference arrows 416 and 418 are oriented perpendicular to the line features 302.

A first edge distance 412 is calculated by taking the distance between the interface point 410 and the first point of the first set of measurement points 402. The first point of the first set of measurement points 402 can be defined as the point closest to the interface point 410 of the first set of measurement points 402. A second edge distance 414 is calculated by taking the distance between the interface point 410 and the first point of the second set of measurement points 404. The first point of the second set of measurement points 404 can be defined as the point closest to the interface point 410 of the second set of measurement points 404. This can be more easily seen by viewing the interface point 410 and the reference arrow sets 416 and 418. The first point of intersection between the measurement points 402, 404 and the reference arrow sets 416, 418 can be measured as the first and second edge distances 412, 414.

The first edge distance 412 and the second edge distance 414 may be in a range between about 100 nm and about 500 nm, such as between about 200 nm and about 400 nm. In one embodiment, either of the first edge distance 412 or the second edge distance 414 are about 350 nm. Measurements are not generally taken within the first edge distance 412 from the interface point 410 or the second edge distance 414 from the interface point 410. This is because the points within this range of the interface boundary 400 contain a large amount of noise and variance. Such noise can drastically skew the data collected from the measurement points 402 and 404. The first edge distance 412 and the second edge distance 414 are selected to reduce noise, while still maintaining an accurate measurement.

It is noted, that while there are 18 measurement points 402, 404 shown in FIG. 4, other numbers of measurement points 402, 404 may be utilized. The minimum number of measurement points 402, 404 that may be used is two measurement points 402, 404. The number of measurement points 402, 404 is between about two measurement points 402, 404 and about 50 measurement points 402, 404. The number of measurement points 402, 404 may generally be described as a plurality of measurement points 402, 404. In one example, the number of measurement points 402, 404 is increased to obtain a greater quantity of data.

Figure 5:
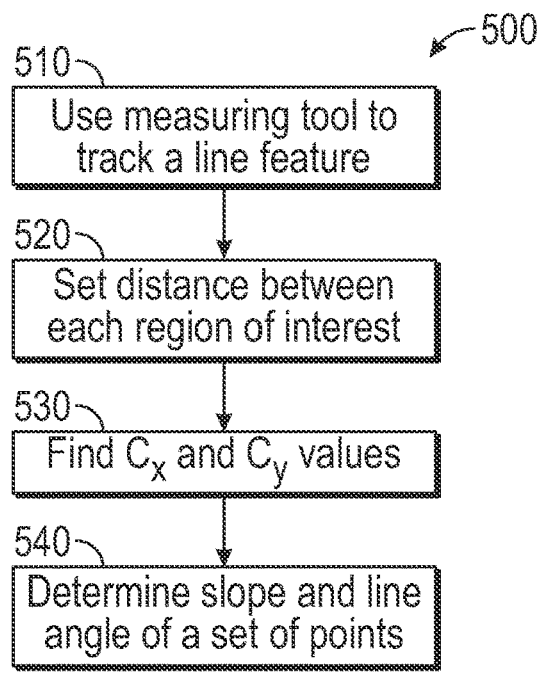
FIG. 5 illustrates operations of a method for determining a line angle of a grating line according to an embodiment of the disclosure.

FIG. 5 illustrates operations of a method 500 for determining a line angle of a grating line according to an embodiment of the disclosure. Operation S10 includes the utilization of a measurement tool to track a line feature. The measurement tool may be a scanning electron microscope. The line feature may be a grating 112 as described above and show in FIGS. 1 and 2. The line feature may also be a set of line features 204 and 206. In this embodiment, multiple line features may be tracked at any given moment. The line feature may also be the line feature 302 described above and in FIGS. 3 and 4.

At operation S20, a distance between each region of interest is set. In the present embodiment, the regions of interest are the measurement regions 304, 306, 308, and 310 discussed in reference to FIG. 3. The distance between each region of interest may be either of the first spacing distance 312 or the second spacing distance 314. The set distance between each region of interest is predetermined so that a sufficient amount of measurements are made to ensure accurate measurement results.

At operation S30, $C_x$ and $C_y$ values are found along the line feature. The $C_x$ and $C_y$ values are equivalent or substantially equivalent to the x-coordinates and the y-coordinates of each coordinate point. This includes the primary coordinate, the secondary coordinate, the tertiary coordinate, and the $n^{th}$ coordinate, such that there are at least three or more coordinate points measured. The $C_x$ and $C_y$ values can be found with respect to any x-y axes as long as the axes are used consistently across all coordinate measurements for that line feature.

At operation S40, the slope and line angle of a line feature is found using the set of coordinate points found in operation S30. The set of coordinate points are used to graph a theoretical line feature within a computer or controller. The slope of the theoretical line feature is calculated using a mathematical formula or program within the computer or controller device. In some embodiments, the slope of multiple line features within a single section are calculated after graphing multiple theoretical line features. If the slope of multiple theoretical line features is calculated, the average of the slope of the multiple theoretical line features is calculated to create an average theoretical line feature slope.

The line angle of each theoretical line feature can be calculated using the slope as well. The line angle of each theoretical line feature is calculated using mathematical formulas and programs within the computer or controller.

As mentioned above, it is possible to utilize measurements from a single line feature, or a group of line features. One advantage of utilizing measurements from a single line feature, is that measurements from a single line feature are more efficient and utilize less processing power to complete the measurements. One advantage of utilizing measurements from a group of line features is that measurements can be averaged which may provide for more accurate and reliable measurements.

Figure 6:
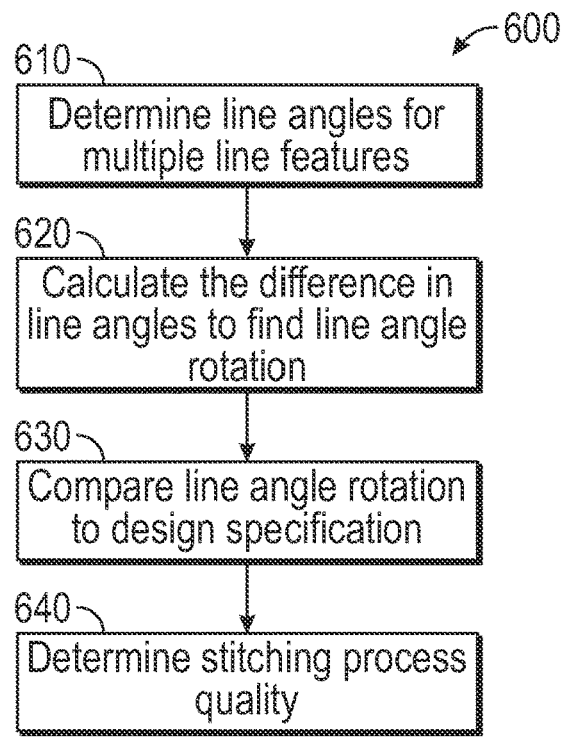
FIG. 6 illustrates operations of a method for determining the stitch process quality of a grating structure according to an embodiment of the disclosure.

FIG. 6 illustrates operations of a method 600 for determining the stitch process quality of a grating structure according to an embodiment of the disclosure. Operation 610 includes determining the line angles for two separate line features, operation 620 includes calculating the difference in line angle between the first and second line features to find line angle rotation, operation 630 includes comparing the line angle rotation to a design specification, and operation 640 includes determining stitching process quality.

At operation 610, line angles for multiple line features are calculated. Line angle calculation includes finding the line angle for two line features, as well as a plurality of additional line features if taking the average line feature slope within a section. The line angles are determined using the method described in the method 500. Operation 610 differs from method 500 in that the slope and line angles for line features in multiple adjacent sections are measured and calculated. The steps described in the method 500 must be completed a second time for a second set of three or more coordinates that are found from a second line feature in a separate, but adjacent section of line features.

At operation 620, the difference between a first line angle of the first section of line features and a second line angle of the second section of line features is calculated. In operation 620, the difference is taken by subtracting one of the first or second line angles from the other. The result of the difference between the first and second line angles is defined as the line angle rotation.

At operation 630, the line angle rotation found in operation 620 is compared to a design specification. The design specification can be a maximum line angle rotation that is allowed in a grating. In some embodiments, the design specification can be as small as 1/100 of a degree or smaller, such as 1/250 of a degree or smaller, 1/500 of a degree or smaller, or 1/1000 of a degree or smaller. The line angle rotation and the design specification are compared by determining if the line angle rotation calculated is smaller than the design specification, larger than the specification, or approximately equal to the specification.

At operation 640, the quality of the stitching process is determined. The degree of line angle rotation compared the design specification determines a stitching process quality. The stitching process quality can be determined on any designated scale. In some embodiments, the stitching process quality can be a pass or fail determination, such that if the line angle rotation is smaller than the design specification, the stitching process quality is considered sufficient to pass. If the line angle rotation is larger than the design specification, the stitching process quality is considered to fail. Operation 640 can be completed computationally on a computer and display on a digital interface, or may be completed by manually reviewing whether a stitching process falls within the desired design specification. Other methods of determining stitching process quality are also contemplated, such as grading the stitching process quality on a scale of 1-100% or 1-10.

It is generally understood that the line features referenced in the above description may be two dimensional line features in certain embodiments. For example, line features 204, 206, 302, and 360 may be 2D line features.

While the foregoing is directed to embodiments of the present disclosure, other and further embodiments of the disclosure may be devised without departing from the basic scope thereof, and the scope thereof is determined by the claims that follow.

What is claimed is:

1. A method of measuring a line angle comprising:
selecting a field of view of a grating structure;
using a measurement tool to identify a line feature;
selecting a starting point along the line feature;
measuring a primary coordinate, the primary coordinate comprising a first x-coordinate and a first y-coordinate, wherein the first x-coordinate is a first distance from an edge of the field of view to the primary coordinate;
measuring coordinates of at least a secondary coordinate along the line feature, the secondary coordinate comprising a second x-coordinate and a second y-coordinate, wherein the second x-coordinate is a second distance from the edge of the field of view to the secondary coordinate;
using the primary coordinate and the secondary coordinate to estimate a theoretical line feature; and
calculating a line angle measurement between the theoretical line feature and a reference axis.

2. The method of claim 1, wherein the measuring tool is a scanning electron microscope.

3. The method of claim 1, wherein the line feature is a line in a grating structure.

4. The method of claim 1, wherein the line feature comprises a two dimensional line feature, and wherein the two dimensional line feature comprises one or more of an elongated pillar, a circular pillar, or contact holes.

5. The method of claim 4, wherein the first distance is a predetermined distance in the range of between about 100 nm and about 500 nm.

6. The method of claim 1, wherein the starting point is greater than 150 nm from a first edge of the field of view, and wherein the first edge of the field of view intersects the line feature.

7. The method of claim 1, wherein the theoretical line feature is calculated using three or more coordinate points.

8. The method of claim 7, wherein the three or more coordinate points are separated by a predetermined distance.

9. The method of claim 8, wherein the predetermined distance varies between each pair of adjacent points.

10. A method of measuring a line angle rotation of a lithography grating structure comprising:
   measuring a first line angle, the measuring comprising;
   (a) selecting a field of view of a grating structure;
   (b) using a measurement tool to identify a line feature;
   (c) selecting a starting point along the line feature;
   (d) measuring a primary coordinate, the primary coordinate comprising a first x-coordinate and a first y-coordinate, wherein the first x-coordinate is a first distance from an edge of the field of view to the primary coordinate;
   (e) measuring coordinates of at least a secondary coordinate along the line feature, the secondary coordinate comprising a second x-coordinate and a second y-coordinate, wherein the second x-coordinate is a second distance from the edge of the field of view to the secondary coordinate;
   (f) using the primary and secondary coordinates to estimate a theoretical line feature; and
   (g) calculating a line angle measurement between the theoretical line feature and a reference axis;
   measuring a second line angle, wherein measuring the second line angle comprises operations (a)-(g);
   calculating a difference of the first line angle and the second line angle to determine the line angle rotation; and
   comparing the line angle rotation with a design specification line angle measurement.

11. The method of claim 10, wherein the measuring tool is a scanning electron microscope.

12. The method of claim 10, wherein the line feature is a line in a grating structure.

13. The method of claim 10, wherein the line feature comprises a two dimensional line feature, and wherein the two dimensional line feature comprises one or more of an elongated pillar, a circular pillar, or contact holes.

14. The method of claim 10, wherein the first distance is a predetermined distance in the range of between about 100 nm and about 500 nm.

15. The method of claim 10, wherein the starting point is greater than 150 nm from a first edge of the field of view, and wherein the first edge of the field of view intersects the line feature.

16. The method of claim 10, wherein the theoretical line feature is calculated using three or more coordinate points.

17. The method of claim 16, wherein the three or more coordinate points are separated by a predetermined distance.

18. The method of claim 17, wherein the predetermined distance varies between each pair of adjacent points.

19. The method of claim 10, wherein the design specification line angle measurement is about 1/500 of a degree or smaller.

20. A method of measuring a line angle rotation of a lithography grating structure comprising:
   positioning a measurement tool to measure a first image exposure in a grating structure;
   measuring a first line angle, the measuring comprising;
   (a) selecting a field of view of a grating structure;
   (b) using the measurement tool to identify a line feature;
   (c) selecting a starting point along the line feature;
   (d) measuring a primary coordinate, the primary coordinate comprising a first x-coordinate and a first y-coordinate, wherein the first x-coordinate is a first distance from an edge of the field of view to the primary coordinate;
   (e) measuring coordinates of at least a secondary coordinate along the line feature, the secondary coordinate comprising a second x-coordinate and a second y-coordinate, wherein the second x-coordinate is a second distance from the edge of the field of view to the secondary coordinate;
   (f) using the primary and secondary coordinates to estimate a theoretical line feature; and
   (g) calculating a line angle measurement between the theoretical line feature and a reference axis;
   positioning a measurement tool to measure a second image exposure in a grating structure;
   measuring a second line angle, wherein measuring the second line angle comprises operations (a)-(g);
   calculating a difference of the first line angle and the second line angle to determine the line angle rotation;
   comparing the line angle rotation with a design specification line angle measurement; and
   determining a stitch quality from the difference of the first line angle and the second line angle.

* * * * *